United States Patent [19]

Kimball

[11] 4,088,636

[45] May 9, 1978

[54] 2,2'-DITHIODIANILINE CURED POLYURETHANE

[75] Inventor: Michael E. Kimball, Norton, Ohio

[73] Assignee: The Goodyear Tire & Rubber Company, Akron, Ohio

[21] Appl. No.: 533,408

[22] Filed: Dec. 16, 1974

[51] Int. Cl.$^2$ .......................................... C08G 18/32
[52] U.S. Cl. .................. 260/77.5 AM; 260/77.5 AC; 260/77.5 AT
[58] Field of Search ............ 260/77.5 AM, 77.5 AC, 260/77.5 AT, 2.5 AM

[56] References Cited

U.S. PATENT DOCUMENTS

| | | | |
|---|---|---|---|
| 3,036,996 | 5/1962 | Kogon | 260/77.5 AM |
| 3,180,883 | 4/1965 | Case | 260/77.5 AT |
| 3,201,358 | 8/1965 | Hostettler et al. | 260/77.5 AC |
| 3,940,371 | 2/1976 | Case | 260/77.5 AM |

*Primary Examiner*—M. J. Welsh
*Attorney, Agent, or Firm*—J. D. Wolfe

[57] ABSTRACT

An improved polyurethane obtained by reacting 3,3'-dimethyldiphenyl methane-4,4'-diisocyanate with a polyether polyol and curing with 2,2'-dithiodianiline in the presence of a catalytic amount of triethylene diamine.

1 Claim, No Drawings

2,2'-DITHIODIANILINE CURED POLYURETHANE

This invention relates to an improved reaction product of 3,3'-dimethyldiphenyl methane-4,4'-diisocyanate (hereinafter DMMDI), a polyether polyol and 2,2'-dithiodianiline.

The prepolymer of DMMDI and polyether polyols are readily cured with 2,2-dithiodianiline to give a polyurethane, but these polyurethanes are deficient in those physicals needed for use in draft gears and other uses wherein generally toluene diisocyanate has been used.

The object of this invention is to provide a method of making improved polyurethanes having improved physicals.

This object and other advantages can be obtained by forming a prepolymer by reacting a polyether polyol of about 500 to 3000 molecular weight with sufficient DMMDI to give a prepolymer having about three to eight percent of free NCO and then reacting this prepolymer with 2,2'-dithiodianiline at an amine level of 0.5 to 1.1 equivalents $NH_2$/equivalent NCO in the presence of 0.01 to 0.5 equivalents triethylene diamine/equivalent NCO at a temperature of 55° to 120° C. A polyurethane prepared as indicated above has better physical properties as measured by the 500 percent modulus and crescent tear relative to a polyurethane prepared by the identical recipe except the triethylene diamine was omitted. This was true even where the temperature and the time of cure was varied to higher levels and the time of cure at the higher levels was longer. When other polyurethane catalysts such as phenyl mercuric propionate and dibutyltin diacetate was substituted for triethylene diamine in this recipe, the physicals of the resulting cured polyurethane were inferior to those obtained where no catalyst was used. In fact, the discovery that triethylene diamine with this specific diamine and this specific diisocyanate improves the physical properties of the polyurethane in the manner indicated is unexpected and unobvious in view of the teachings at page 337 of Saunder's Rubber Chemical & Technology, Volume 32 (1959) that triethylene diamine is not a catalyst for the amine-NCO reaction or the urea-NCO reactions but this type reaction appears to be the rationale for explaining the improvement in physicals obtained. For instance, infrared analysis on uncatalyzed cured polyurethane shows the presence of free NCO even where the cure temperature is 100° C. for a prolonged time, whereas the use of triethylene diamine catalyst to cure polyurethane shows more of the NCO has reacted.

The polyether polyols of 2,3,4 and higher hydroxyls useful in this invention are those well known to the polyurethane art having a molecular weight of 700 to 6500 and the preferred ones are polypropylene ether glycol or triols, the polytetramethylene ether glycol or triol.

The nature of this invention can be understood more readily from the following representative and illustrative example where all parts and percentages are by weight unless dotherwise indicated.

EXAMPLE

A polyurethane prepolymer was made by degassing a mixture of 1400 parts of polytetramethylene glycol of 1000 molecular weight, 2100 parts of polytetramethylene glycol of 2000 molecular weight and 35 parts of di-tert-butyl-paracresol and then reacting with 1440 parts of DMMDI to reduce the free NCO content to 4.43 percent. To one portion of 120 parts of this prepolymer, 0.12 parts of triethylene diamine was added and then intimately mixed with 12 parts of 2,2'-dithio dianiline before being cast into test strips. Control test strips were cast as above except the addition of triethylene diamine was omitted. These strips were cured for 16 hours at 95° C. before the physical tests shown in Table 1 were run.

Table 1

| Physical Tests | Modulus 300% | Modulus 500% | Ultimate | cent gation % | Crescent Tear lb/in | Compression Set 25%* |
|---|---|---|---|---|---|---|
| Strip made without triethylene diamine | 2200 | 2890 | 3000 | 515 | 417 | 54 |
| Strip made with triethylene diamine | 2340 | 3990 | 4960 | 555 | 587 | 39 |

*Determined by ASTM Method B.

Normally, the prepolymer is made to have about three to eight percent free NCO. Thus, the ratio of amino to NCO radicals determines the amount of triethylene diamine used. Since the triethylene diamine catalyzed polyurethane has improved crescent tear and compression set, it is more satisfactory for several uses where the polyurethane is subjected to high compressive forces in a cyclic manner.

While certain representative embodiments and details have been shown for the purpose of illustrating the invention, it will be apparent to those skilled in this art that various changes and modifications may be made therein without departing from the spirit or scope of this invention.

What is claimed is:

1. A method of making a polyurethane substantially free of unreacted NCO and having improved physical properties consisting essentially of forming a prepolymer prepared by reaction of a polyether polyol of 2 to 4 hydroxyls of 700 to 6500 molecular weight and 3,3'-dimethyldiphenyl-methane-4,4'-diisocyanate, said prepolymer having from 3 to 8 percent free NCO, then reacting the prepolymer in the presence of 0.01 to 0.5 equivalents of triethylene diamine per equivalent of free NCO with 2,2'-dithiodianiline on the basis of 0.5 to 1.1 equivalents of amino per equivalent of excess NCO at a temperature of 55° to 120° C.

* * * * *